United States Patent [19]

Yang

[11] Patent Number: 5,228,167
[45] Date of Patent: Jul. 20, 1993

[54] ADJUSTABLE LENGTH WINDSHIELD WIPER

[76] Inventor: Ming-Tung Yang, No. 4-3, Lane 97, Lung Chuan St., Panchiao, Taipei Hsien, Taiwan

[21] Appl. No.: 900,458

[22] Filed: Jun. 18, 1992

[51] Int. Cl.⁵ .......................... B60S 1/28; B60S 1/04
[52] U.S. Cl. ................. 15/250.39; 15/250.42; 15/250.41
[58] Field of Search ........... 15/250.42, 250.41, 250.21, 15/250.23, 250.38, 250.39

[56] References Cited

U.S. PATENT DOCUMENTS

| | | | |
|---|---|---|---|
| 2,663,043 | 12/1953 | Oishei | 15/250.42 |
| 3,922,749 | 12/1975 | Castleman et al. | 15/250.42 |
| 4,547,925 | 10/1985 | Blackborow et al. | 15/250.42 |
| 4,813,095 | 3/1989 | Sato | 15/250.21 |

FOREIGN PATENT DOCUMENTS

| | | | |
|---|---|---|---|
| 0681957 | 10/1952 | United Kingdom | 15/250.42 |
| 2120927 | 12/1983 | United Kingdom | 15/250.42 |

*Primary Examiner*—Harvey C. Hornsby
*Assistant Examiner*—Gary K. Graham
*Attorney, Agent, or Firm*—Bacon & Thomas

[57] ABSTRACT

The invention is an adjustable windscreen wiper whose length shall be freely adjustable to fit windscreen of all sizes with a compact structuring to lower manufacture cost and higher the value of wiper.

2 Claims, 5 Drawing Sheets

ADJUSTABLE LENGTH WINDSHIELD WIPER

BACKGROUND OF THE INVENTION

Windscreen wipers currently in the market are of many types with lengths ranging from 10 to 40 inches to fit windscreens of different sizes. As each different kind of these diverse types must be manufactured by its own mould, the costs for molding makes the manufacturer of windscreen wipers uneconomical. Moreover, customers who would have their wipers renewed must go to a mechanic for advice, or must purchase a pair of wipers according to the size of the original pair, lest they should risk buying something that could not be used. For a longer pair will not fit the windscreen, while a shorter pair will result in poor performance.

SUMMARY OF THE INVENTION

The adjustable windscreen wiper according to the present invention refers to a new type of wiper structure in which the length of the blade is adjustable according to the size of the windscreen. It is structured with two detachable and adjustable frame rods—the main and sub-frame rods—whose lower edges are designed to house the blade so that the length of the wiper is freely adjustable to fit windscreens of all sizes. The adjustable windscreen wiper overcomes the disadvantages of the mono-structure wiper and conventional windscreen wipers, to lower the manufacturing cost, to increase the value of the windscreen wiper and to make it satisfy the needs of the customers.

DETAILED DESCRIPTION OF THE PREFERRED EMBODIMENT

Figure 1:
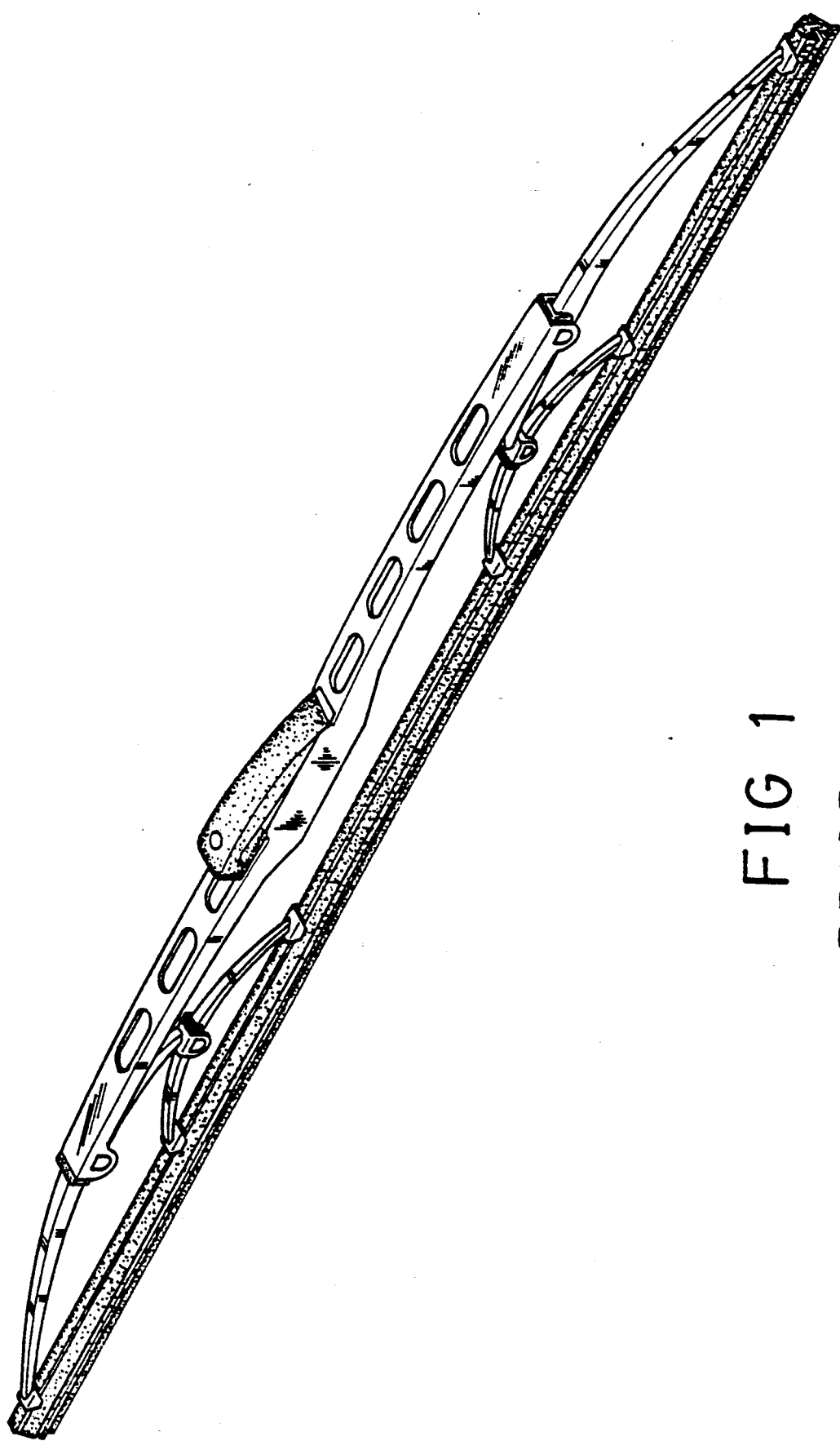
FIG. 1 is a perspective view of a conventional windscreen wiper.
Figure 2:
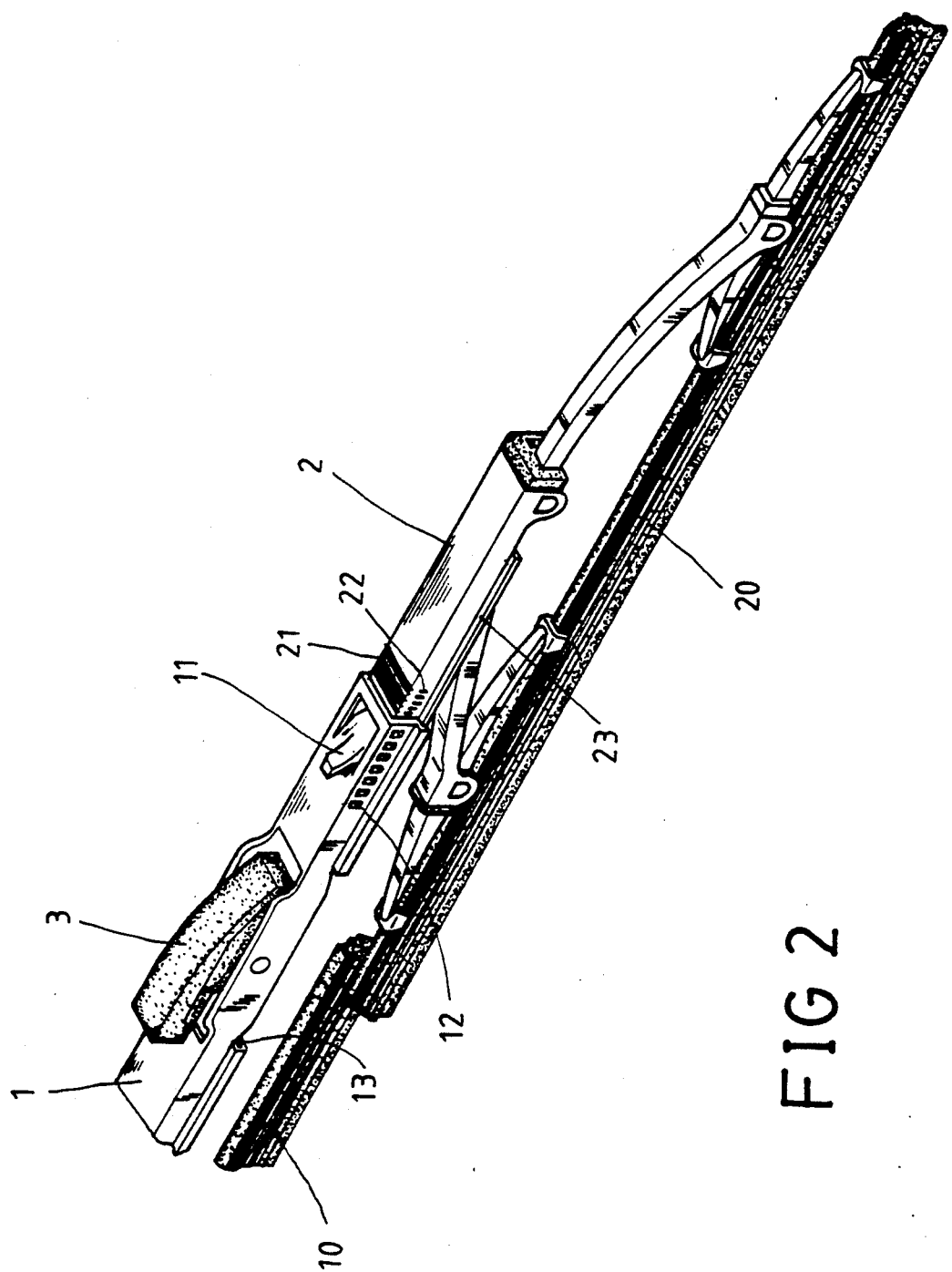
FIG. 2 is a partial perspective view of the adjustable length windscreen wiper according to the present invention.
Figure 3:
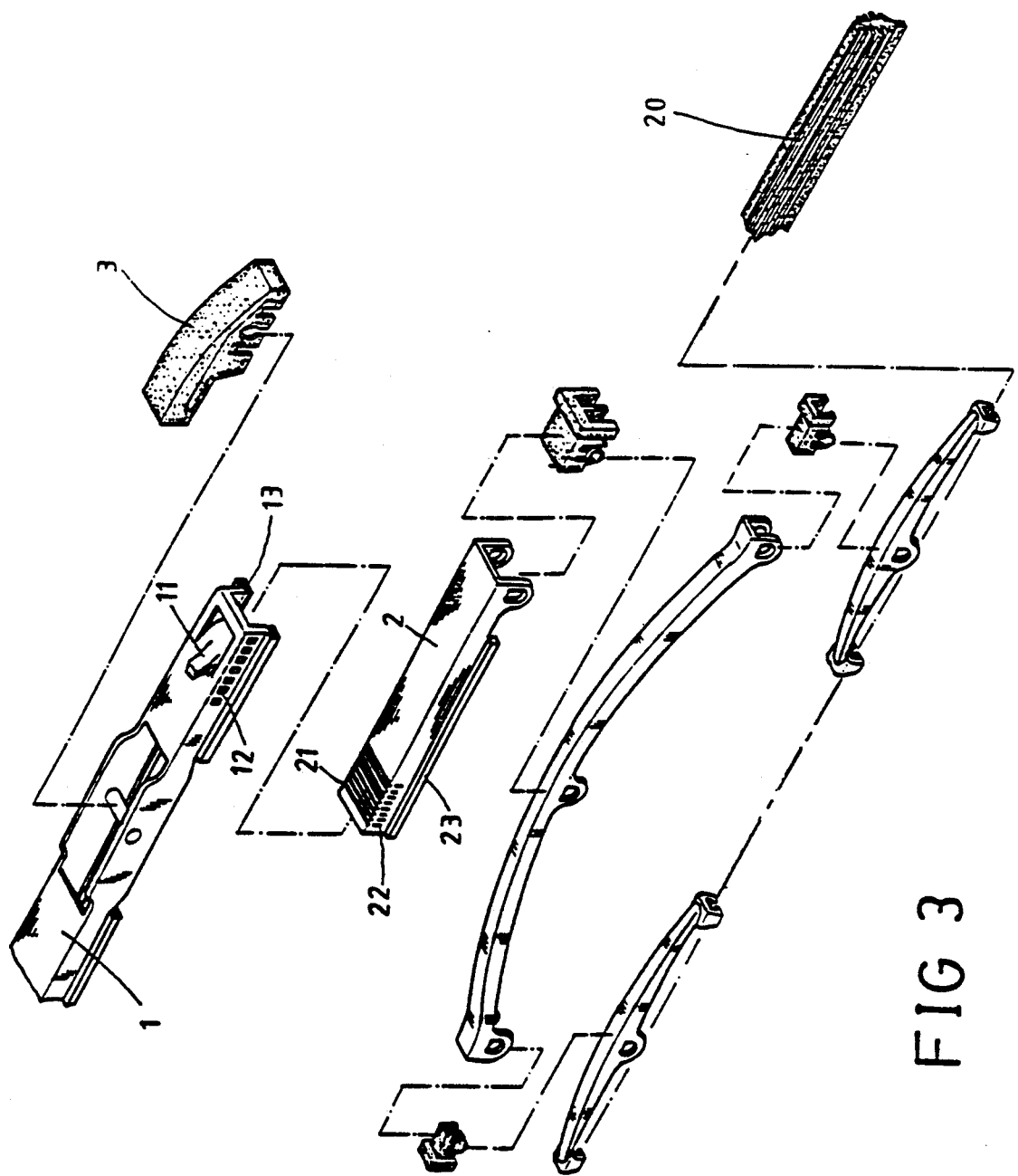
FIG. 3 is a partial, exploded, perspective view of the invention of FIG. 2.

As seen in FIGS. 2 and 3, the present invention is designed to compensate for the disadvantages of conventional windscreen wipers and a re-structuring of the conventional wiper frame into two detachable frame-rods—the main frame rod (1) and the sub-frame rod (2) in which the frame rod (1) is an inverted "U"-shaped structuring whose upper edge is connected to the wiper arm saddle (3) which the lower edge is attached to the wiper blade (10) by known means. An end is equipped with an elastic clip-pin (11) that can be structured for different ways of installation such as injection, slide-on, press-in and click-in types. The two sides of the inverted "U" at this end are formed with inwardly extending projection (12) whose interval enables the length of the wipers to be adjusted. The lower edges define female channels (13) for the insertion of the sub-frame rod (2). The sub-frame rod (2) is also an inverted "U" shaped structuring designed for installation with the main frame rod (1). Its upper edge defines horizontal teeth (21) with the two sides formed with notches (22) in pairs that, in conjunction with the clip-pin (11), and the projections (12) fixes the sub-frame rod (2) to the main frame rod (1). The lower part of the sub-frame rod (2) has a rail (23) extending therefrom for insertion into the main frame rod (1) through the female channels (13). The main frame rod (1) is fixed at a desired length by the action of the projection (12) and the notches (22). The length of the sub-rod with blade (2) on the lower part may be determined from the numbers of projections (12) and notches (22), as well as from the teeth (21) that are clipped by the clip-pin (11). Both the blades (10) & (20) on the main frame rod (1) and sub-frame rod (2) are in an overlapping position so as to execute the cleaning job for the windscreen.

Figure 4:
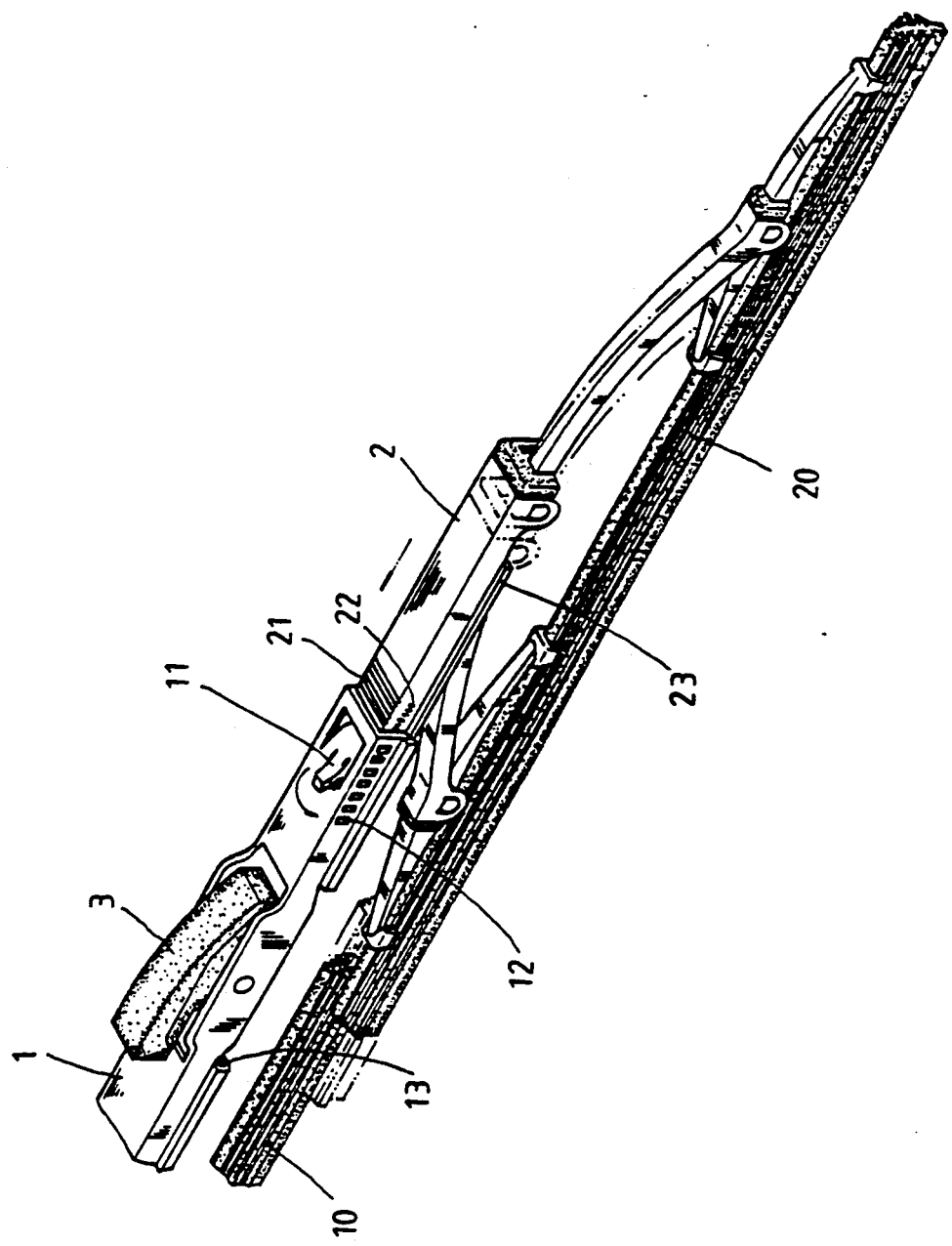
FIG. 4 is a partial, perspective view showing the length adjustment according to the invention.

The length of the sub-frame rod (2) that is housed by the main frame rod (1) is controlled with the clip-pin (11). As shown in FIG. 4, when a slight force is applied to the clip-pin (11) the sub-frame rod (2) may be freely shifted through the channels (13) and rails (23) and from the numbers of the projections (12) and the notches (22) and the reading of the teeth (21), the desired length can be found and fixed by releasing the clip-pin (11) which clips onto the teeth (21) to accomplish the adjustment. The blades (10) & (20) are then in an overlapping position and render cleaning service as wipers at that length do. To re-adjust the device, repeat the above steps and both frames can be shifted to another desired length with the blades (10) and (20) always in an overlapping position to clean windscreens of all sizes, to produce performance of wipers that has never seen and to be convenient for manufacturers to manufacture.

Figure 5:
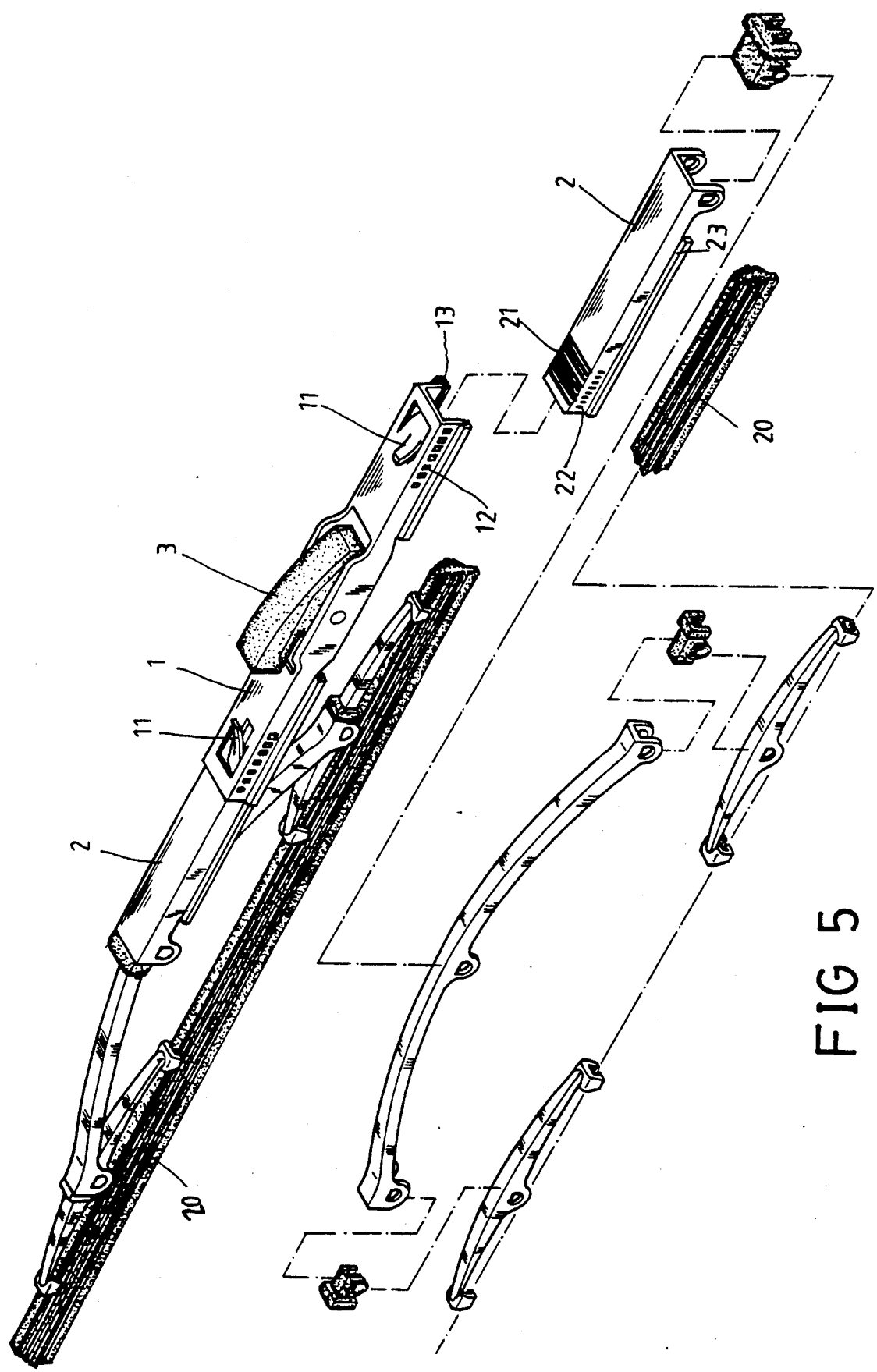
FIG. 5 is an exploded perspective view of an embodiment of the present invention including a two way adjustment structure.

In addition, in case of a desired length which exceeds the total length of the two frame rods (1) & (2), a second sub-frame rod may be added to the structuring as shown in FIG. 5. Clip-pin (11), projections (12), and female channels (13) can be equipped at both ends of the main frame rod (1) in which two sub-frame rods (2) with teeth (21), notches (22), male rail (23) and blade (2) at the lower part are to be housed so that the device becomes a two-way-adjustable-wiper that renders the same performance as the above type with a double adjustment.

The purpose of the invention is thus to provide an adjustable windscreen wiper whose compact wiper may be easily adjusted to fit windscreens of all sizes, produce performance that has never been seen and satisfy the psychological needs of consumers.

The secondary purpose of the invention is to make use of the detachable structure of the main frame rod to house the sub-frame rod so that the length of the wiper may be adjusted to a desired length, and the blades located at the lower part of each of the frame rods is always in overlapping positions that shall not affect the cleaning function of the wiper, but add novel and practical features to conventional windscreen wipers.

I claim:

1. An adjustable length windscreen wiper blade assembly comprising:
   a) An elongated main frame rod adapted to be attached to a windscreen wiper arm, the main frame rod having at least one end portion with an inverted, generally "U"-shaped transverse cross-section defining apposing sides;
   b) a plurality of spaced apart inwardly extending projections formed on said opposing sides of the inverted generally "U"-shaped cross-section portion of the main frame rod;

c) a clip pin movably connected with the main frame rod such that a portion extends into the inverted, generally "U"-shaped cross-section portion;

d) inwardly opening channels on said opposing sides of the inverted, generally "U"-shaped cross-section portion of the main frame rod;

e) an elongated sub-frame rod having an inverted, generally "U"-shaped transverse cross-section defining opposing sides adapted to be slidably received in the inverted, generally "U"-shaped cross section portion of the main frame rod, the sub frame rod defining a plurality of teeth adapted to be engaged by the clip pin and a plurality of spaced apart notches along said opposing sides of the inverted, generally "U"-shaped cross-section located so as to engage at least one of the plurality of spaced apart projections;

f) a rail extending outwardly from each side of the sub-frame rod so as to be slidably received in the inwardly opening channels;

g) first means to attach a first wiper blade to the main frame rod;

h) second means to attach a second wiper blade to the sub-frame rod such that the first and second wiper blades are in overlapping positions; and wherein sliding movement of the subframe rod in the main frame rod provides relative longitudinal movement between the blades.

2. The adjustable length windscreen wiper blade assembly of claim 1 wherein the main frame rod has a second end portion with an inverted, generally "U"-shaped transverse cross-section defining opposite sides and wherein the first means to attach the first wiper blade comprises:

a) a plurality of second spaced apart inwardly extending projections formed on said opposing sides of the second end portion;

b) a second clip pin movably connected with the second end of the main frame rod such that a portion extends into the second end portion of the main frame rod;

c) second inwardly opening channels on said opposing sides of the second end portion of the main frame rod;

d) an elongated second sub frame rod having an inverted, generally "U"-shaped transverse cross section defining opposing sides adapted to be slidably received in the second end portion of the main frame rod, the second sub frame rod defining a plurality of second teeth adapted to be engaged by its second clip pin and a plurality of second spaced apart notches along said opposing sides of the inverted, generally "U"-shaped cross section so as to engage at least one of the plurality of second spaced apart projections;

e) a rail extending outwardly from each side of the second sub-frame rod so as to be slidably received in the second inwardly opening channels; and, f) means to attach the first wiper blade to the second sub-frame rod.

* * * * *